(12) United States Patent
Lang et al.

(10) Patent No.: US 10,493,948 B2
(45) Date of Patent: Dec. 3, 2019

(54) PRESSURE WAVE GENERATING INFLATOR DEVICE WITH SLIDABLE GAS GENERATOR

(71) Applicant: AUTOLIV ASP, INC., Ogden, UT (US)

(72) Inventors: Gregory J. Lang, Ogden, UT (US); Bradley W. Smith, Plain City, UT (US)

(73) Assignee: AUTOLIV ASP, INC., Odgen, UT (US)

( * ) Notice: Subject to any disclaimer, the term of this patent is extended or adjusted under 35 U.S.C. 154(b) by 133 days.

(21) Appl. No.: 15/808,427

(22) Filed: Nov. 9, 2017

(65) Prior Publication Data

US 2019/0135223 A1    May 9, 2019

(51) Int. Cl.
*B60R 21/272*  (2006.01)
*B60R 21/264*  (2006.01)
*B60R 21/26*   (2011.01)

(52) U.S. Cl.
CPC .......... *B60R 21/272* (2013.01); *B60R 21/264* (2013.01); *B60R 2021/26076* (2013.01)

(58) Field of Classification Search
CPC ................ B60R 21/272; B60R 21/264; B60R 2021/26076
See application file for complete search history.

(56) References Cited

U.S. PATENT DOCUMENTS

| 3,773,353 | A | * | 11/1973 | Trowbridge | .......... | B60R 21/272 |
| | | | | | | 102/443 |
| 5,732,972 | A | * | 3/1998 | Johnson | ................ | B60R 21/272 |
| | | | | | | 102/531 |
| 5,913,537 | A | | 6/1999 | Goetz | | |
| 6,253,683 | B1 | | 7/2001 | Fukabori | | |
| 6,629,703 | B2 | | 10/2003 | Horton et al. | | |
| 6,764,097 | B2 | | 7/2004 | Kelley et al. | | |

(Continued)

FOREIGN PATENT DOCUMENTS

JP   2017-121858 A    7/2017
WO   WO 2013/123371 A1   8/2013

OTHER PUBLICATIONS

U.S. Patent Office, English language version of the International Search Report, Form PCT/ISA/210 for International Application PCT/US2018/057036, dated Feb. 5, 2019 (2 pages).

(Continued)

*Primary Examiner* — Darlene P Condra
(74) *Attorney, Agent, or Firm* — Pauley Erickson & Kottis

(57) ABSTRACT

An inflatable restraint system inflator device having a housing defining an elongated chamber and containing an initial supply of stored inflation gas. An initiator is disposed proximate the first axial end of the housing and an operable closure is disposed proximate the second axial end of the housing. A slidable gas generator assembly is disposed within the chamber between the initiator and the closure and includes a supply of gas generant material reactable upon initiation to produce additional inflation gas. Upon actuation, the initiator and the slidable gas generator assembly cooperate to create a pressure wave to open the closure and to permit release of inflation gas. The slidable gas generator assembly slides within the elongated chamber and gas material reacts to form additional inflation gas.

23 Claims, 10 Drawing Sheets

(56) References Cited

U.S. PATENT DOCUMENTS

| | | | |
|---|---|---|---|
| 7,883,108 B2 | 2/2011 | Robinette et al. | |
| 8,608,196 B2* | 12/2013 | Quioc | B01D 46/24 |
| | | | 280/736 |
| 9,205,802 B1 | 12/2015 | Lang et al. | |
| 2003/0000200 A1 | 1/2003 | Watkins | |
| 2004/0046374 A1* | 3/2004 | Yamazaki | B60R 21/261 |
| | | | 280/741 |
| 2006/0091660 A1 | 5/2006 | Lang et al. | |
| 2006/0261584 A1* | 11/2006 | Blackburn | B60R 21/2644 |
| | | | 280/741 |
| 2009/0058059 A1* | 3/2009 | Young | B60R 21/268 |
| | | | 280/737 |
| 2017/0028964 A1 | 2/2017 | Bierwirth | |
| 2017/0166162 A1* | 6/2017 | Last | B60R 21/264 |

OTHER PUBLICATIONS

U.S. Patent Office, English language version of the Written Opinion of the International Searching Authority, Form PCT/ISA/237 for International Application PCT/US2018/057036, dated Feb. 5, 2019 (8 pages).

* cited by examiner

PRESSURE WAVE GENERATING INFLATOR DEVICE WITH SLIDABLE GAS GENERATOR

BACKGROUND

Field

This development relates generally to vehicle passenger safety restraint systems such as used to provide impact protection for an occupant of a motor vehicle and, more particularly, to inflator devices useful in such systems and effective to meet and satisfy the stringent performance criteria associated with such systems, particularly for such systems for side airbag applications.

Discussion of Related Art

Vehicular inflatable restraint systems, e.g., airbag systems, were developed to supplement conventional safety belts and typically act or serve to protect an occupant in a vehicle by absorbing physical impact resulting upon a vehicle collision using the elasticity of an airbag cushion, with the airbag cushion being deployed into the space between an occupant and an interior object or surface in the vehicle during a collision event. The deployed airbag acts or serves to decelerate the occupant, thus reducing the possibility of injury to the occupant caused by unintended contact with the interior of the vehicle.

Many typical airbag systems consist of several individual components joined to form an operational module. Such components generally include an airbag, an inflator, a sensor, and an electronic control unit. Airbags are typically constructed or made of a thin, durable fabric or other material that is folded to fit into a compartment of a steering wheel, dashboard, vehicle seat, compartment, roof, roof rail, or other space or location in or of a vehicle. The airbag inflator is in fluid communication with the airbag cushion, and is configured to supply or produce a gas to inflate the airbag when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator using one or more of various technologies, such as including pyrotechnic compounds and stored pressurized gas, produces, forms or otherwise supplies or provides a volume of an inflation gas.

Many types of inflator devices have been disclosed in the art for inflating an inflatable restraint system airbag cushion. One category of such inflator devices is often referred to as "compressed gas inflators" and generally refers to various inflator devices which contain compressed gas.

As is known, one particular type of compressed gas inflator, sometimes referred to as a "stored gas inflator," simply contains a quantity of a stored compressed gas which is selectively released to inflate an associated airbag cushion.

Another known type of compressed gas inflator is commonly referred to as a "hybrid" inflator. In such an inflator device, inflation gas results from a combination of stored compressed gas and the combustion of a gas generating material, e.g., a pyrotechnic.

In typical airbag systems, the inflation gas is channeled into the airbag, to inflate the airbag. Inflation of the airbag causes it to deploy, placing it in position to receive the impact of a vehicle occupant. After inflation, the airbag rapidly deflates such as by venting the inflation gas from an opening or openings in the airbag and thus facilitating the occupant to exit the vehicle.

As experience in the manufacture and use of airbags has increased, the engineering challenges involved in their design, construction, and use have become better understood.

Airbag systems can generally be classified into systems such as a driver airbag system, a passenger airbag system, and a side airbag system.

The use of side airbags, also sometimes referred to as side impact airbags, is widespread in present day automotive technology. Typically, a side airbag is stored or located in an inner side structure, such as a pillar of a vehicle or in a backrest of a seat of a vehicle and, in the event of an impact or collision helps to protect an occupant, especially the thorax of an occupant, during a side impact or collision.

In practice, side airbag systems are generally installed to prevent or otherwise minimize or reduce harm to an occupant resulting from colliding with the vehicle side or door as well as to prevent an occupant from being injured by fragments of a broken door window or to prevent an occupant from being expelled from a vehicle body such as, for example, when the occupant is inclined to the door or the door is dented inward upon the side collision of the vehicle.

As will be appreciated, as compared to frontal impacts and frontal airbags, side impacts or collisions such as to cause or produce the deployment of a side airbag typically result in a significantly reduced period of time between the occurrence of deployment event, e.g., the vehicle collision or impact, and contact of the occupant with the deployed airbag.

Hybrid inflators have found desirable application in side airbag systems. Suitable such hybrid inflators are commonly composed of a tubular hybrid inflator housing containing a supply of reactive material and a supply of pressurized gas supplying material. In practice, such tubular inflator housings commonly have an elongated tubular form and discharge inflation gas from one end. In such an inflator device, the discharge end is, prior to actuation, normally closed or sealed with a seal that can be opened or unsealed, such as by rupturing, breaking, fracturing or the like, at or under appropriate conditions.

To satisfy or meet the Time To First Gas ("TTFG") requirement imposed by many OEM's and to desirably reduce the internal operating pressures in the inflator devices, some side/curtain hybrid inflator devices utilize a pressure wave to open the gas retaining end seal, e.g., to rupture an outlet burst disk, and to allow gas from within the inflator device to exit and start the inflation of an associated inflatable device. To ensure a sufficiently robust pressure wave, inflators that incorporate pyrotechnic materials to supplement the gas output are typically designed with a central channel aligned with the initiator opening. This channel allows for a relatively unobstructed propagation of the pressure wave down the length of the inflator, minimizing the loss in pressure wave intensity.

Unfortunately, the need for the inclusion or presence of such a channel typically has led to inflator device incorporation and use of more expensive and complicated generant geometries such as wafers or grains. Furthermore, inflator devices where lower cost tablets have been used have typically required the incorporation and use of gas generant material retaining hardware that is more complicated and more expensive than otherwise desired.

Thus, there is a need and a demand for improved inflator devices such as for improved hybrid inflator devices such as avoids the need for having or forming a central channel aligned with the initiator opening for the unobstructed propagation of a pressure wave down the length of the inflator for the rapid opening of an inflator end closure and which desirably allows for the incorporation or inclusion relatively less costly gas generant material forms such as tablets, as compared to more expensive and complicated generant geometries such as wafers or grains, for example.

SUMMARY

A general object of the subject development is to provide an improved inflator device.

A more specific objective of the subject development is to overcome one or more of the problems described above.

A more specific object of at least certain aspects of the subject development is to provide an improved hybrid inflator device such as avoids the need for the inclusion of a central channel aligned with the initiator opening for the unobstructed propagation of a pressure wave down the length of the inflator for the rapid opening of an inflator end closure but which also desirably allows for the incorporation or inclusion of relatively less costly gas generant material forms such as tablets, as compared to more expensive and complicated generant geometries such as wafers or grains, for example.

In accordance with one aspect of the subject development, a specially designed and constructed inflator device for an inflatable restraint system is provided.

In one particular embodiment, the inflator device includes a housing defining an elongated chamber and has oppositely disposed first and second axial ends. The elongated chamber contains an initial supply of stored inflation gas. An initiator is disposed proximate the first axial end and an operable closure is disposed proximate the second axial end. The inflator device also includes a slidable gas generator assembly disposed within the elongated chamber between the initiator and the closure. The slidable gas generator contains or includes a supply of gas generant material, such as is reactable upon initiation to produce additional inflation gas.

Upon actuation of the inflator device, the initiator and the slidable gas generator assembly are adapted to cooperate to create a pressure wave to open the closure and to permit release of inflation gas from the elongated chamber and at least a portion of the supply of the gas material reacts to form said additional inflation gas.

In accordance with one embodiment, upon actuation of the inflator device, the initiator is adapted to produce an output effective to slide the slidable gas generator assembly within the elongated chamber in an axial direction towards the second end and the slide movement of the slidable gas generator assembly is effective to create the pressure wave to open the closure.

In accordance with another aspect or embodiment, there is provided a hybrid inflator device for an inflatable restraint system. Such an inflator device includes a housing that defines an elongated axially-extending chamber and has oppositely disposed first and second axial ends. The elongated chamber contains an initial supply of stored inflation gas. The hybrid inflator device further includes an initiator disposed proximate the first axial end and an openable closure disposed proximate the second axial end. The hybrid inflator device also includes a slidable gas generator assembly disposed within the elongated chamber between the initiator and the closure. The slidable gas generator assembly includes a downstream open top cup-shaped baffle spaced apart from an upstream end baffle with a supply of tablet form gas generant material disposed between the baffles. The gas generant material is reactable upon initiation to produce additional inflation gas. Further, the downstream baffle and the upstream baffle are independently slidable within the elongated chamber. Upon actuation of the hybrid inflator device, the initiator and the slidable gas generator assembly are adapted to cooperate to create a pressure wave to open the closure and to permit release of inflation gas from the elongated chamber and with the slidable gas generator assembly adapted to slide within the elongated chamber in an axial direction towards the second end and to initiate reaction of at least a portion of the supply of the gas material to form said additional inflation gas.

As used herein, references to an "openable" or "temporary" closure and the like are to be understood to generally refer to a closure element such as a burst disk, seal or the like and such as can be opened or unsealed, such as by being ruptured, broken, fractured or the like, at or under appropriate conditions.

Other objects and advantages will be apparent to those skilled in the art from the following detailed description taken in conjunction with the appended claims and drawings.

DETAILED DESCRIPTION

Example embodiments will now be described more fully with reference to the accompanying drawings. As will be appreciated, certain standard elements not necessary for an understanding of the subject development may have been omitted or removed from the drawings for purposes of facilitating illustration and comprehension.

In the following description, numerous specific details are set forth such as examples of specific components, devices, and methods, to provide a thorough understanding of embodiments of the present disclosure. It will be apparent to those skilled in the art that specific details need not be employed, that the example embodiments should not be construed to limit the scope of the present disclosure. Furthermore, well-known processes, well-known device structures, and well-known technologies are not described herein in detail.

Figure 1:
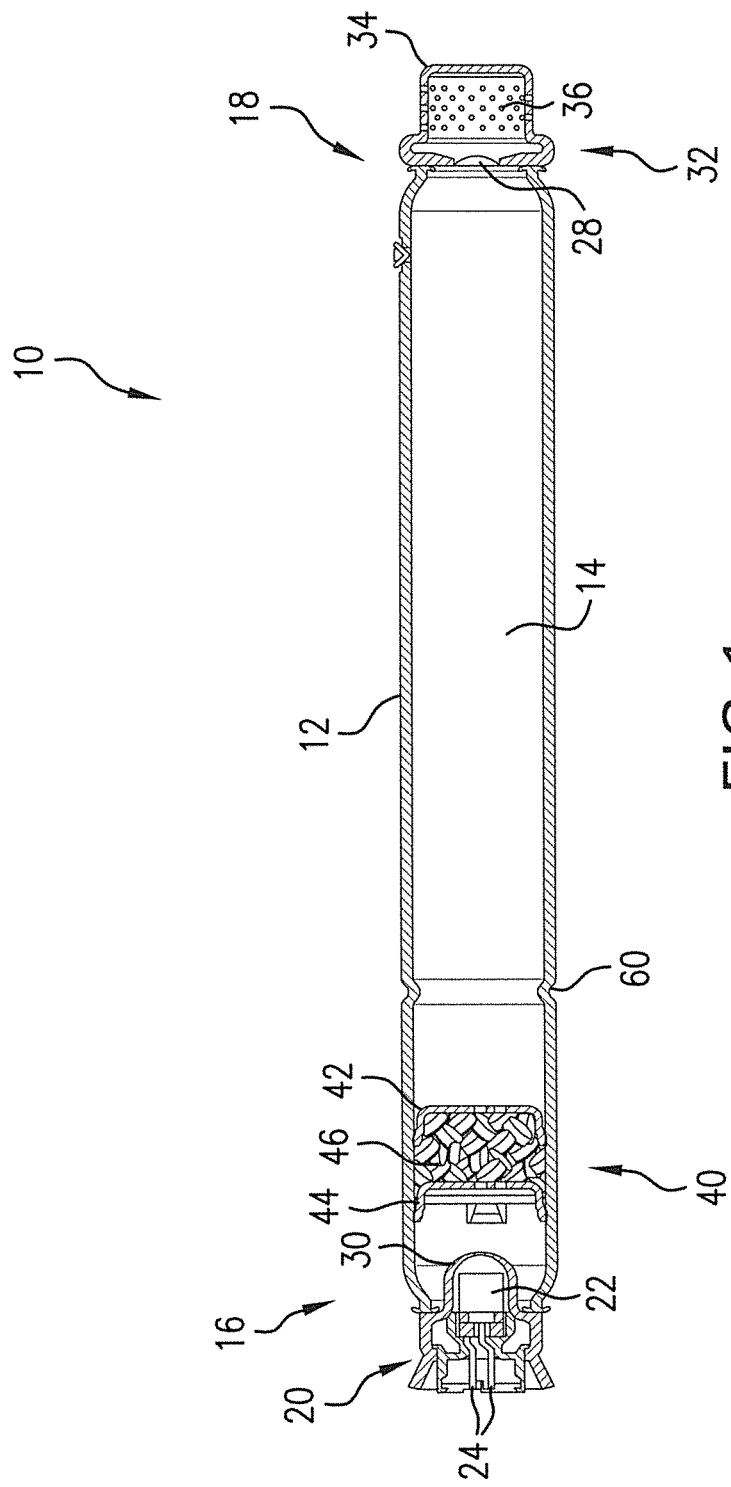
FIG. 1 is a sectional view of an inflator device in accordance with one embodiment of the present development.

With reference now to the drawings, wherein like reference characters designate like or corresponding parts throughout the several views, there is shown in FIG. 1 a vehicular safety restraint inflator device, generally designated with the reference numeral 10, in accordance with one embodiment of the subject development. While the subject development will be described hereinafter with particular reference to a side inflator device such as for use in conjunction with a side airbag cushion in a side airbag inflatable restraint system installation, those skilled in the art and guided by the teachings herein provided will understand and appreciate that the broader practice of the subject development is not necessarily so limited as the development can have general applicability to other types or kinds of airbag assemblies including, for example, knee airbags, driver, and passenger front airbags, as may be desired and such as may find application in various restraint assemblies such as for automotive vehicles including vans, pick-up trucks, and particularly automobiles.

The inflator device 10 is a hybrid inflator device. In this regard, the inflator device 10 functions to deliver inflation gases that are the result of a combination of stored compressed gas and combustion products from combustion of a gas generating pyrotechnic material to a passive restraint air bag system (not particularly shown).

The inflator device 10 is illustrated as generally including a housing 12. The housing 12 defines an elongated axially-extending chamber or channel 14 and has a first axial end 16 and an oppositely disposed second axial end 18. A supply of pressurized gas may be stored in the chamber 14.

An initiator assembly 20, such as including an initiator 22, is disposed, carried or otherwise appropriately situated proximate the first end 16. In the illustrated embodiment, the initiator assembly 20 is joined or connected to the housing 12 such as by inertia welding or other chosen manner such as are well-known in the art.

A pair of electrical conductive pins 24 extend from the initiator 22. The initiator 22 can be conventional in construction and operation insofar as the present teachings are concerned. In this regard, the initiator 22 includes an initiator pyrotechnic material and is operative to produce an output effective, as detailed below, to result in the production or creation of a pressure wave for opening or unsealing an openable or temporary closure, device or element such as a burst disk 28, for example, that is disposed, carried or otherwise appropriately situated proximate the second end 18. The initiator assembly 20 may further include a pressure dome 30.

A diffuser assembly 32, such as known in the art and such as including an end diffuser 34, is disposed, carried or otherwise appropriately situated proximate the second end 18. The end diffuser 34 may for example and as shown include a plurality of spaced apart openings 36 wherethrough inflation gas from the inflator device 10 can be appropriately discharged.

The inflator device 10 further includes a slidable gas generator assembly 40 disposed within the elongated chamber 14 between the initiator 22 and the closure 28. As detailed below and in accordance with one embodiment, upon actuation of the inflator device 10, the initiator 22 is adapted to produce an output effective to slide the slidable gas generator assembly 40 within the elongated chamber 14 in an axial direction towards the second end 18 and wherein the slide movement of the slidable gas generator assembly 40 is effective to create the pressure wave to open the closure 18.

In this illustrated embodiment, the slidable gas generator assembly 40 includes a downstream open top cup-shaped baffle 42 spaced apart from an upstream end closure baffle 44. A supply of gas generant material, generally designated by the reference numeral 46, is disposed between the baffles 42 and 44. The gas generant material 46 is generally reactable upon initiation to produce additional inflation gas.

As discussed in greater detail below, the gas generant material 46 in this embodiment is or generally has the form of tablets. Further, the downstream baffle 42 and the upstream baffle 44 are independently slidable within the elongated chamber 14.

Upon actuation of the inflator device 10, the initiator 22 and the slidable gas generator assembly 40 are adapted to cooperate to create a pressure wave to open the closure 28 and to permit release of inflation gas from the elongated chamber 14 and at least a portion of the supply of the gas material 46 reacts to form additional inflation gas. For example, in one embodiment, the initiator 22 is adapted to produce an output effective to slide the slidable gas generator assembly 40 within the elongated chamber 14 in an axial direction towards the second end 18 and wherein the slide movement of the slidable gas generator assembly 40 is effective to create the pressure wave to open the closure 28. The output from the initiator 22 also desirably serves to initiate reaction of at least a portion of the supply of the gas generant material 46 to form additional inflation gas.

Figure 2:
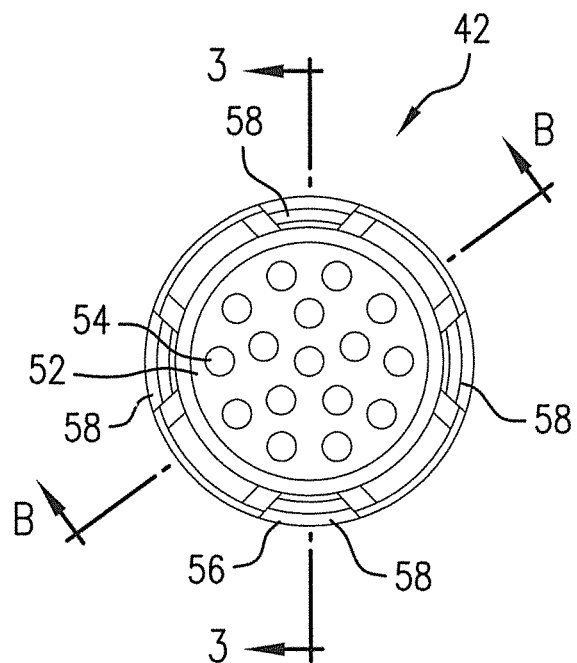
FIG. 2 is a bottom plan view of the slidable gas generator assembly baffle of the inflator device shown in FIG. 1
Figure 3:
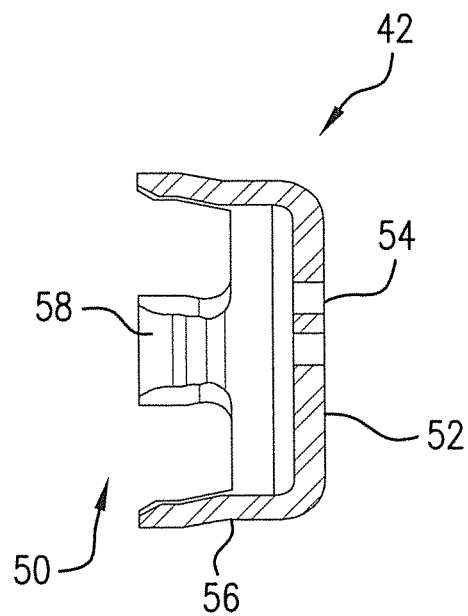
FIG. 3 is a cross sectional view taken along the line 3-3 of the slidable gas generator assembly baffle shown in FIG. 2.

Reference is now made to FIG. 2 and FIG. 3 which show the downstream baffle 42 in more specific detail. In this illustrated embodiment, the downstream baffle 42 and the upstream baffle 44 are of similar construction, shape and form, however, as detailed further below the broader practice of the subject development is not necessarily so limited as slidable gas generator assemblies having dissimilar downstream and upstream baffles are herein contemplated and may be preferred in particular embodiments.

The baffle 42 is generally cup-shaped and has an open top 50. The baffle 42 has a generally axially perpendicular planar wall 52 such as including a plurality of perforations 54 to allow for gas passage from within the slidable gas generator assembly and into the open elongated chamber of the inflator. That is, the perforations 54 can desirably provide a flow path for gas from within the slidable gas generator assembly 40 out into the chamber 14 and ultimately out of the inflator device 10.

The baffle 42 also has or includes an axially extending side wall 56 joined to or formed with the planar wall 52. As shown the axially extending side wall can be formed of or otherwise include a plurality of deformable tabs 58. In one preferred embodiment, the deformable tabs 58 are adapted upon longitudinal insertion of the respective baffle into the elongated chamber to deform and interference fit the respective baffle into a desired pre-actuation position within the elongated chamber.

As will be appreciated, such deformable tabs 58 can act or serve to interfere with the inside diameter of the chamber 14. During the insertion into the chamber, the tabs experience both elastic and plastic deformation allowing the baffle to easily slide into the chamber. The deformable tabs greatly reduce the force required to insert the baffle into the chamber and allow the chamber to be constructed of tubing or the like having a larger internal diameter (ID) tolerance. Thus, such design and construction can desirably reduce or minimize and preferably eliminate the need for precision control of the chamber internal diameter (ID) and the baffle outer diameter (OD).

The illustrated baffle 42 is shown as including four tabs 58 generally equal or evenly spaced about the perimeter of the baffle. While the broader practice of the subject development is not limited to embodiments having or including such deformable tabs, in accordance with certain preferred embodiments, baffles including three, four or more than four such tabs may be preferred. Those skilled in the art and guided by the teachings herein provided will understand and appreciated that generally the design of the number and size of such deformable tabs can involve consideration of one or more factors including, for example, the diameter size of the inflator device and the desired degree of slide resistance and may, for example, involve a balance of providing a desired degree of slide resistance and simplified and/or efficient manufacture and production.

Further embodiments wherein such plurality of tabs are generally equally or evenly spaced about the perimeter to of the baffle may be preferred. For example, a construction having equally or evenly spaced tabs can facilitate assembly and placement with an inflator device as no specific or particular alignment of the tabs within the inflator device may be required upon assembly.

In the making or constructing of the inflator device 10, once the downstream baffle 42 is in position, the gas generant material 46, such as in the form of generant tablets, is loaded into the chamber 14 and the upstream baffle 44 installed such as to enclose or otherwise appropriately contain the gas generant material 46 between the baffles 42 and 44 of the slidable gas generator assembly 40 disposed within the chamber 14.

During installation, the upstream baffle 44 can be desirably pressed slightly beyond the point where the baffle 44 makes contact with the gas generant material 46. Such positioning or placement can desirably create a slight compression load of the gas generant, such as can serve to avoid or minimize the potential for "rattle" or the like of the gas generant material within the inflator device while the inflator device is in a transport or pre-actuation state or condition. The tab features on the baffle can desirably provide or produce enough resistance, upon device assembly, to avoid or prevent undesired movement during inflator manufacture, handling and storage but allow relative ease of movement during deployment. The rapid movement of the gas generator assembly during deployment desirably serves to create the pressure wave that in turn opens the inflator device end closure, e.g., burst disk, and such as to allow discharge of inflation gas from the inflator device.

If desired and such as shown in the FIG. 1 inflator device 10, a stop feature such as generally designated by the reference numeral 60 may be included. The inclusion of such a stop feature 60 or the like can desirably serve to limit axial movement of the slidable gas generator assembly 40 within the elongated chamber 14, as may be desired in particular embodiments.

In this particular illustrated embodiment, the stop feature 60 has the form of a reduction in the chamber 14 diameter appropriately located downstream, e.g., approximately 25 mm, from the end of the downstream baffle 42. Those skilled in the art and guided by the teachings herein provided will appreciate that the exact location or placement of the stop feature can appropriately vary depending on a variety of factors, including, the specific configuration of the inflator device, the size and/or mass of the gas generator assembly, amount and/or type of initiator output, the density of the stored gas, the mass of the gas generator assembly and the like, for example.

The stop feature, e.g., the reduction in chamber diameter, can act or serve to limit the movement of the gas generator assembly 40 within the inflator device 10 and thus, for example, help to reduce or minimize inflator performance variation. As will be appreciated by those skilled in the art and guided by the teachings herein provided, absent the presence of such a stop or the like, the gas generator assembly would, upon opening of the closure end of the chamber, ultimately move to the open closure end of the chamber. The inclusion of a stop feature prevents this from happening.

In accordance with one preferred embodiment, the stop feature is desirably disposed no more than 30 mm from the pre-actuation position of the downstream baffle.

If the reduction or stop is located too far from the downstream baffle, increased variation can occur. Moving the stop too close to the downstream baffle can severely limit movement of the gas generator assembly and thus act to inhibit the formation of a strong pressure wave which in turn can delay the opening of the inflator device end closure, e.g., burst disk, and result in undesired increases in the time to first gas (TTFG) and combustion pressures within the inflator device. As will be appreciated, increasing the time to first gas can detrimentally impact inflator performance. Further, increasing the combustion pressures within the inflator device can necessitate the construction of thicker, heavier and/or more expensive inflator devices.

As identified above, the broader practice of the subject development is not necessarily limited to the incorporation and use of inflator devices having downstream and upstream baffles of the same or similar design and/or form. To that end, reference is now made to FIG. 4 which illustrates a vehicular safety restraint inflator device, generally designated with the reference numeral 110, in accordance with another embodiment of the subject development.

The inflator device 110 is in many respects similar to the inflator device 10 shown in FIG. 1 and described above. For example, the inflator device 110 is also a hybrid inflator device such as functions to deliver inflation gases that are the result of a combination of stored compressed gas and combustion products from combustion of a gas generating pyrotechnic material to a passive restraint air bag system (not particularly shown).

The inflator device 110 generally includes a housing 112 that defines an elongated axially-extending chamber or channel 114 and has a first axial end 116 and an oppositely disposed second axial end 118. A supply of pressurized gas may be stored in the chamber 114.

An initiator assembly 120, such as including an initiator 122, is disposed, carried or otherwise appropriately situated proximate the first end 116. In the illustrated embodiment, the initiator assembly 120 is joined or connected to the housing 112 such as by inertia welding or other chosen manner such as are well-known in the art.

A pair of electrical conductive pins 124 extend from the initiator 122. The initiator 122 can be conventional in construction and operation insofar as the present teachings are concerned. In this regard, the initiator 122 includes an initiator pyrotechnic material and is operative to produce an output effective, as detailed below, to result in the production or creation of a pressure wave for opening or unsealing an openable or temporary closure, device or element such as a burst disk or the like 128, for example, that is disposed, carried or otherwise appropriately situated proximate the second end 118. The initiator assembly 120 may further include a pressure dome 130.

A diffuser assembly 132, such as known in the art and such as including an end diffuser 134, is disposed, carried or otherwise appropriately situated proximate the second end 118. The end diffuser 134 may for example and as shown include a plurality of spaced apart openings 136 wherethrough inflation gas from the inflator device 110 can be appropriately discharged.

The inflator device 110 further includes a slidable gas generator assembly 140 disposed within the elongated chamber 114 between the initiator 122 and the closure 128.

In this illustrated embodiment, the slidable gas generator assembly 140 includes a downstream open top cup-shaped baffle 142 spaced apart from an upstream end closure baffle 144. A supply of gas generant material, generally designated by the reference numeral 146, is disposed between the baffles 142 and 144. The gas generant material 146 is generally reactable upon initiation to produce additional inflation gas.

The gas generant material 146 in this embodiment is or generally has the form of tablets. However, whereas the downstream baffle 42 and the upstream baffle 44 of the inflator device 10 were of similar construction, shape and form, the downstream baffle 142 and the upstream baffle 144 of the inflator device 110 are dissimilar. Moreover, rather than being independently slidable and insertable in or within the inflator chamber, like the baffles 42 and 44 described above, the baffles 142 and 144 can desirably form a preassembled slidable gas generator assembly 140 for press fit insertion into the inflator chamber 114.

Upon actuation of the inflator device 110, the initiator 122 and the slidable gas generator assembly 140 are adapted to cooperate to create a pressure wave to open or unseal the openable or temporary closure 128 and to permit release of inflation gas from the elongated chamber 114 and at least a portion of the supply of the gas material 146 reacts to form additional inflation gas. For example, in one embodiment, the initiator 122 is adapted to produce an output effective to slide the slidable gas generator assembly 140 within the elongated chamber 114 in an axial direction towards the second end 118 and wherein the slide movement of the slidable gas generator assembly 140 is effective to create the pressure wave to open the closure 128. For example, the initiator 122 may suitably produce an output so as to rapidly pressurize the volume 147 behind and adjacent the slidable gas generator assembly 140 such as to cause or result in the slidable gas generator assembly 140 to rapidly accelerate and create the pressure wave to open the closure 128. The output from the initiator 122 also desirably serves to initiate reaction of at least a portion of the supply of the gas generant material 146 to form additional inflation gas.

Figure 5:
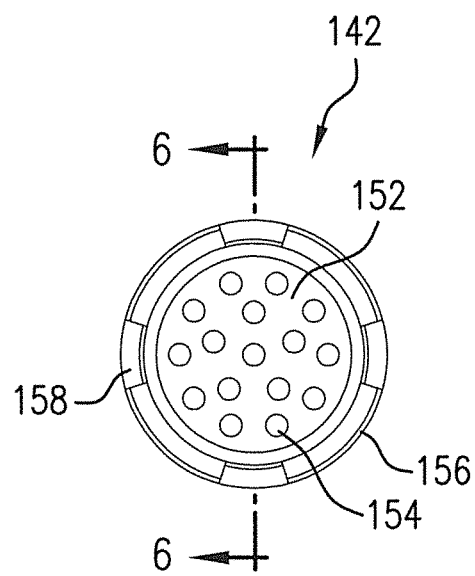
FIG. 5 is a bottom plan view of the downstream baffle of the slidable gas generator assembly of the inflator device shown in FIG. 4.
Figure 6:
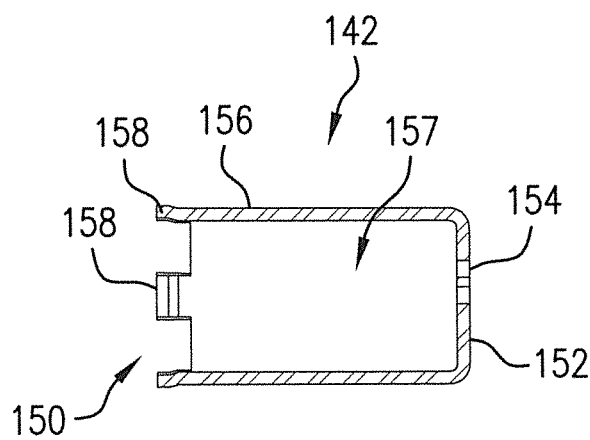
FIG. 6 is a cross sectional view taken along the line 6-6 of the downstream baffle shown in FIG. 5.

Reference is now made to FIG. 5 and FIG. 6 which show the downstream baffle 142 in more specific detail. The baffle 142 is generally cup-shaped and has an open end or top 150. The baffle 142 has a generally axially perpendicular planar wall 152 such as including a plurality of perforations 154 to allow for gas passage from within the slidable gas generator assembly and into the open elongated chamber of the inflator. That is, the perforations 154 can desirably provide a flow path for gas from within the slidable gas generator assembly 140 out into the chamber 114 and ultimately out of the inflator device 110.

The baffle 142 has or includes an axially extending side wall 156 joined to or formed with the planar wall 152. In this embodiment, the axially extending wall 156 is elongated to create or form a cavity 157 sufficiently sized to hold or contain the desired quantity of the gas generant material 146.

As shown the axially extending side wall 156 can be formed of or otherwise include a plurality of deformable tabs 158 such as formed at the end of the axially extending side wall 156 opposite the planar wall. These deformable tabs 158, similar to the deformable tabs 58 described above, are adapted upon longitudinal insertion of the respective baffle into the elongated chamber to deform and interference fit the respective baffle into a desired pre-actuation position within the elongated chamber.

As will be appreciated, such deformable tabs 158 can act or serve to interfere with the inside diameter of the chamber 14. During the insertion into the chamber, the tabs experience both elastic and plastic deformation allowing the baffle to easily slide into the chamber. The deformable tabs greatly reduce the force required to insert the baffle into the chamber and allow the chamber to be constructed of tubing or the like having a larger internal diameter (ID) tolerance. Thus, such design and construction can desirably reduce or minimize and preferably eliminate the need for precision control of the chamber internal diameter (ID) and the baffle outer diameter (OD).

Similar to the baffle 42 described above, the illustrated baffle 142 is shown as including four tabs 158 generally equal or evenly spaced about the perimeter of the baffle. While, as described above, the broader practice of the subject development is not limited to embodiments having or including such deformable tabs, in accordance with certain preferred embodiments, baffles including three or four such tabs may be preferred. Further as described above, embodiments wherein such plurality of tabs are generally equally or evenly spaced about the perimeter to of the baffle may be preferred.

Figure 7:
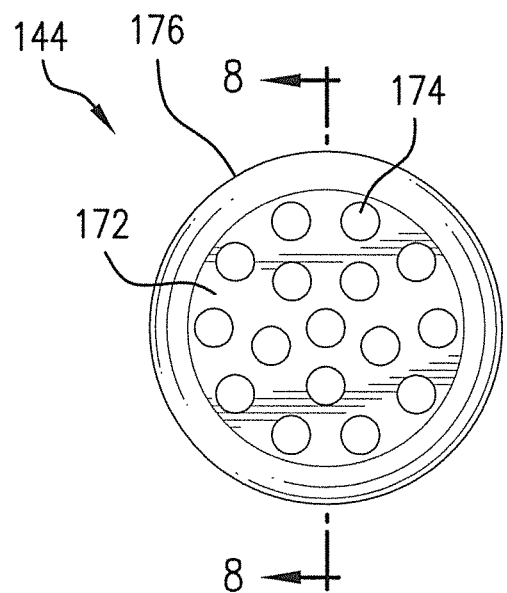
FIG. 7 is a bottom plan view of the upstream baffle of the slidable gas generator assembly of the inflator device shown in FIG. 4.
Figure 8:
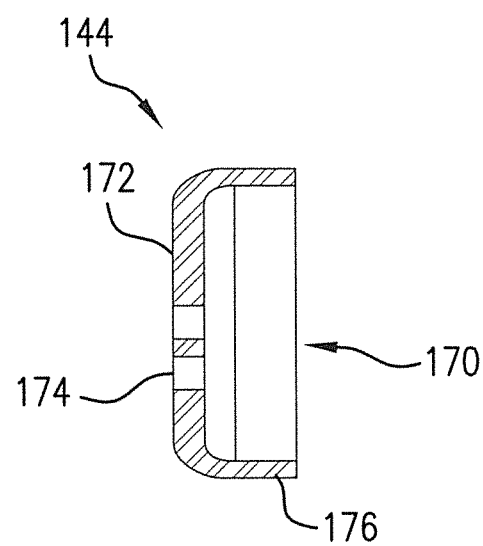
FIG. 8 is a cross sectional view taken along the line 8-8 of the upstream baffle shown in FIG. 7.

Reference is now made to FIG. 7 and FIG. 8 which show the upstream baffle or cup 144 in more specific detail. The baffle 144 is generally cup-shaped having an outwardly facing open end 170. The baffle 144 has a generally axially perpendicular planar wall 172 such as including a plurality of perforations 174 to allow communication of initiator formed discharge materials with the gas generant material within the slidable gas generator assembly unit 140. The baffle 144 also has or includes an axially extending side wall 176 joined to or formed with the planar wall 172.

The baffle 144 is generally designed and sized to fit in closing engagement with the open end of the baffle 142. For example, the upstream baffle 144 can be appropriately held in position by a press fit with the downstream baffle 142 or by locally deforming the downstream baffle 142 to a smaller diameter than the upstream baffle 142.

In the making or constructing of the inflator device 110, the gas generant material 146 can be appropriately loaded into the downstream baffle or cup 142. The upstream baffle or end closure 144 is subsequently inserted or fitted into the open end of the baffle 142 to retain the gas generant material 146 within the baffle cavity 157 and thus forming as a unit the slidable gas generator assembly 140. The slidable gas generator assembly unit 140 can then be appropriately press fit into the chamber 114 and pushed to the desired location along the length of the chamber.

Figure 13:
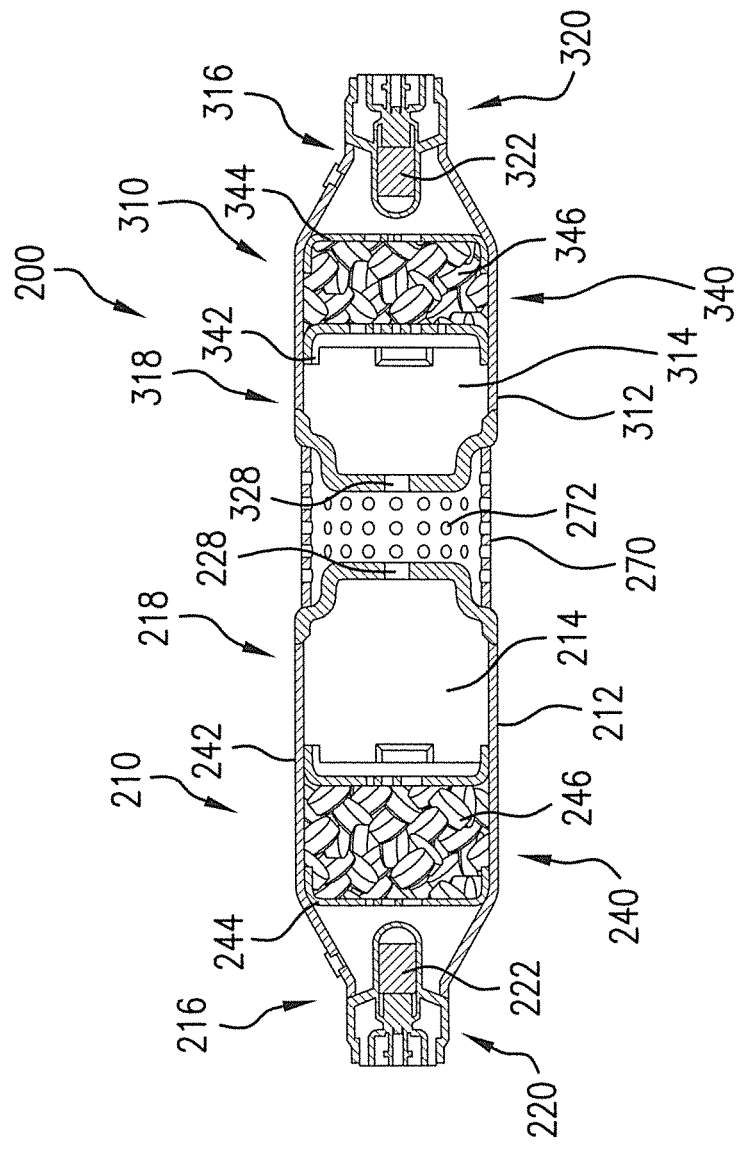
FIG. 13 is a sectional view of an inflator device in accordance with another embodiment of the present development.

Turning to FIG. 13 there is illustrated an inflator device 200 in accordance with another embodiment of the present development.

This embodiment is a multi-stage or dual stage version of the inflator device described above. More particularly, and as described in greater detail below, such multi-stage or dual stage version is generally composed of two of the inflator devices or gas generator assemblies as described above oriented with the distal ends facing each other (such that the initiator areas are generally advantageously available for electrical connection to an Electronic Control Unit (ECU), such as is known in the art).

The inflator device 200 includes a first inflator portion 210 somewhat similar to the inflator device 10 described above. The first inflator portion 210, similar to the inflator device 10 includes a housing 212 that defines an elongated axially-extending chamber or channel 214 and has a first axial end 216 and an oppositely disposed second axial end 218. A supply of pressurized gas may be stored in the chamber 214. An initiator assembly 220, such as including an initiator 222 such as similar to the initiator 22, is disposed, carried or otherwise appropriately situated proximate the first end 216. The first inflator portion 210, similar to the inflator device 10, further includes a slidable gas generator assembly 240 disposed within the elongated chamber 214 between the initiator 222 and the closure 228. The slidable gas generator assembly 240, similar to the slidable gas generator assembly 140 includes a downstream baffle 242 spaced apart from an upstream end closure baffle 244 with a supply of gas generant material 246 disposed therebetween.

The inflator 200 includes a second inflator portion 310 also somewhat similar to the inflator device 10 described above. The second inflator portion 310, similar to the inflator device 10 includes a housing 312 that defines an elongated axially-extending chamber or channel 314 and has a first axial end 316 and an oppositely disposed second axial end 318. A supply of pressurized gas may be stored in the chamber 314. An initiator assembly 320, such as including an initiator 322, is disposed, carried or otherwise appropriately situated proximate the first end 316. The first inflator portion 310, similar to the inflator device 10, further includes a slidable gas generator assembly 340 disposed within the elongated chamber 314 between the initiator 322 and the closure 328. The slidable gas generator assembly 340 includes a downstream baffle 342 spaced apart from an upstream end closure baffle 344 with a supply of gas generant material 346 disposed therebetween.

The two inflator devices or gas generator assemblies 210 and 310 oriented with the distal ends facing each other, can be advantageously connected therebetween or joined together by, with or via a filter portion 270 such as is crimped or otherwise attached thereto. The filter portion 270 may for example and as shown include a plurality of spaced apart openings 272 wherethrough inflation gas from either or both the inflator devices and/or gas generator assemblies 210 and 310 can be appropriately discharged.

While such an inflator device embodiment can advantageously be operated such as with the ECU determining the firing sequence of the two stages such as based on selected factors such as may include the severity of the impact and the restraint required to protect the occupant such as known in the art, those skilled in the art and guided by the teachings herein provided will understand and appreciate that unlike prior dual or multistage inflator devices, the inflator device 200 advantageously employs first and second slidable gas generator assembly 240 and 340, respectively, such as described herein, and with the advantages and benefits attendant therewith.

Those skilled in the art and guided by the teachings herein provided will understand and appreciate that in or with the broader practice of the subject development, the construction and/or orientation of gas generator assemblies and the baffles utilized therein can be appropriately altered such as to satisfy manufacturing or production exigencies for particular applications. Thus, for example, in the inflator device 200, the downstream baffles 242 and 342 while of generally similar in design and construction to the upstream baffle 44 of inflator device 10 are oppositely orientated and similarly, the upstream baffles 244 and 344 while of generally similar in design and construction to the downstream baffle 42 of inflator device 10 are also oppositely orientated.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

Examples 1-5

In these tests, inflator tank performance results were obtained using inflators having the following designs:

Example 1

An inflator device as shown in FIG. 1 but with no stop feature such as to limit movement of the slidable gas generator assembly along the length of the inflator chamber upon actuation of the inflator device.

Figure 9:
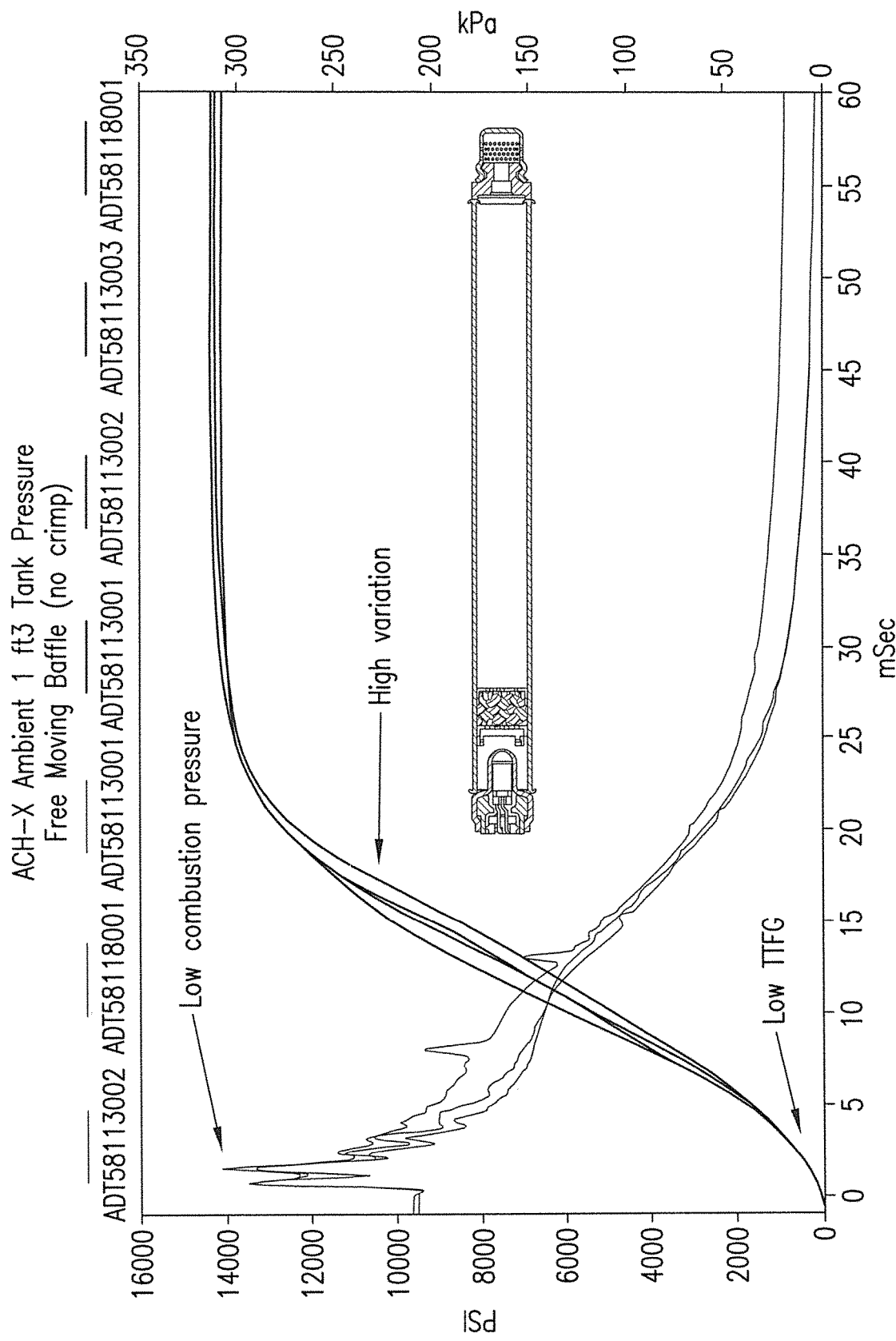
FIG. 9-12 are graphical presentations of inflator tank performance (e.g., pressure versus time) for inflator devices in accordance with alternative embodiments of the subject development.

Inflator Tank Performance curves obtained with the inflator device of Example 1 are shown in FIG. 9.

Example 2

An inflator device as shown in FIG. 1 but with the stop feature located immediately adjacent the slidable gas generator assembly such the movement by the slidable gas generator assembly along the length of the inflator chamber was prevented upon actuation of the inflator device.

Figure 10:
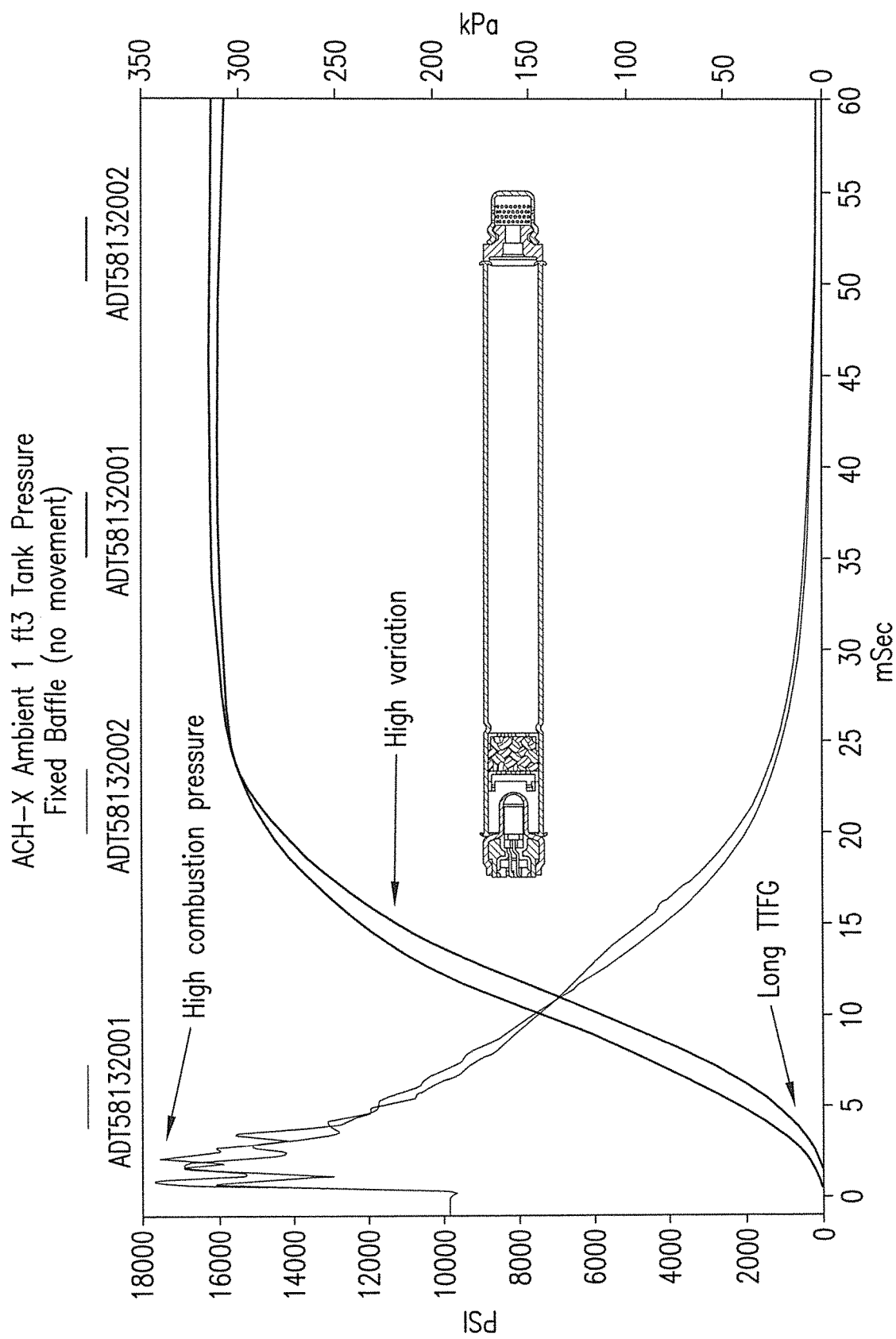

Inflator Tank Performance curves obtained with the inflator device of Example 2 are shown in FIG. 10.

Example 3

An inflator device as shown in FIG. 1 with the stop feature located at 25 mm from the end of the slidable gas generant assembly such that the slidable gas generator assembly has appropriately limited movement along the length of the inflator chamber upon actuation of the inflator device.

Figure 11:
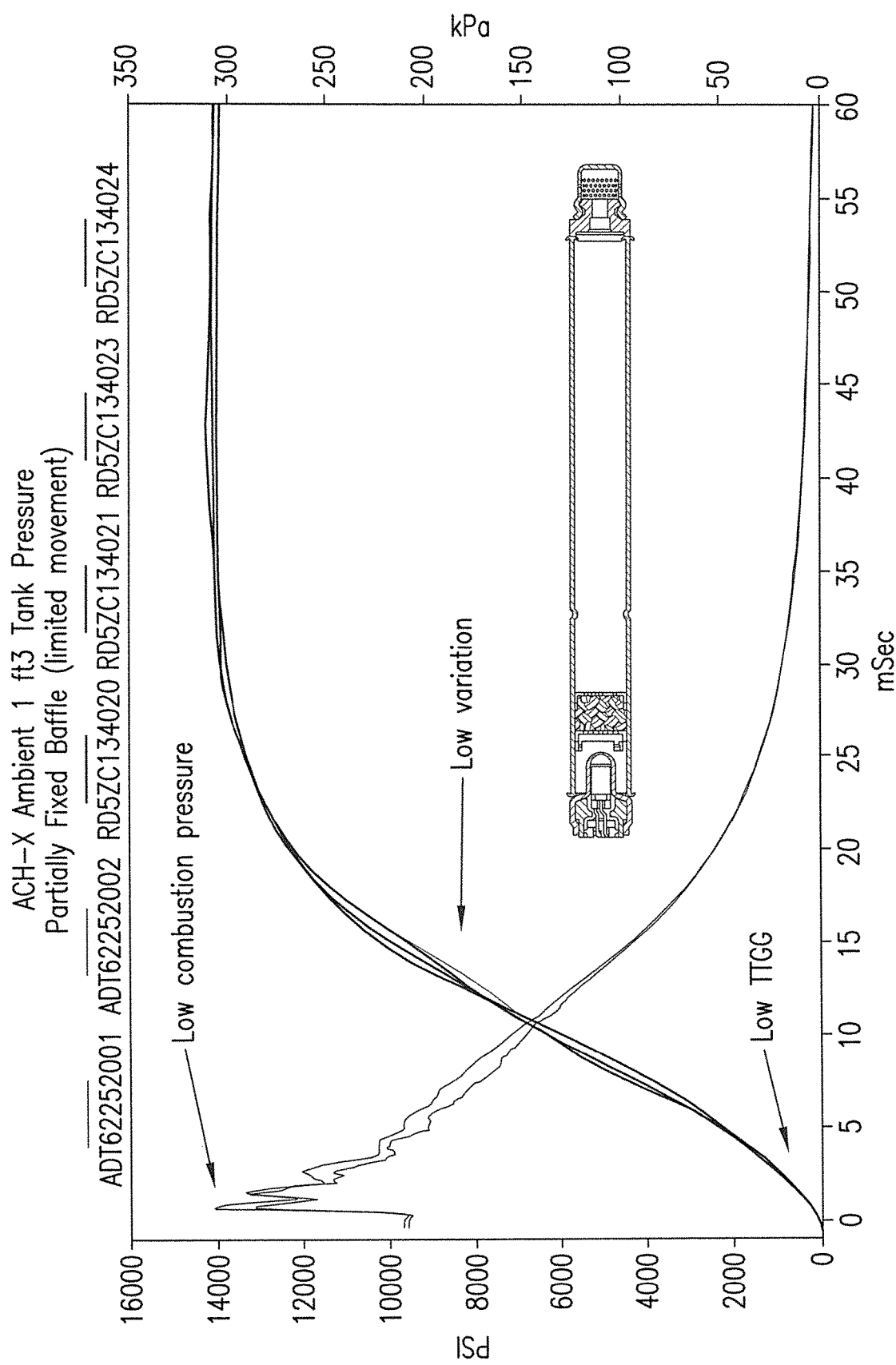

Inflator Tank Performance curves obtained with the inflator device of Example 3 are shown in FIG. 11.

Example 4

Figure 4:
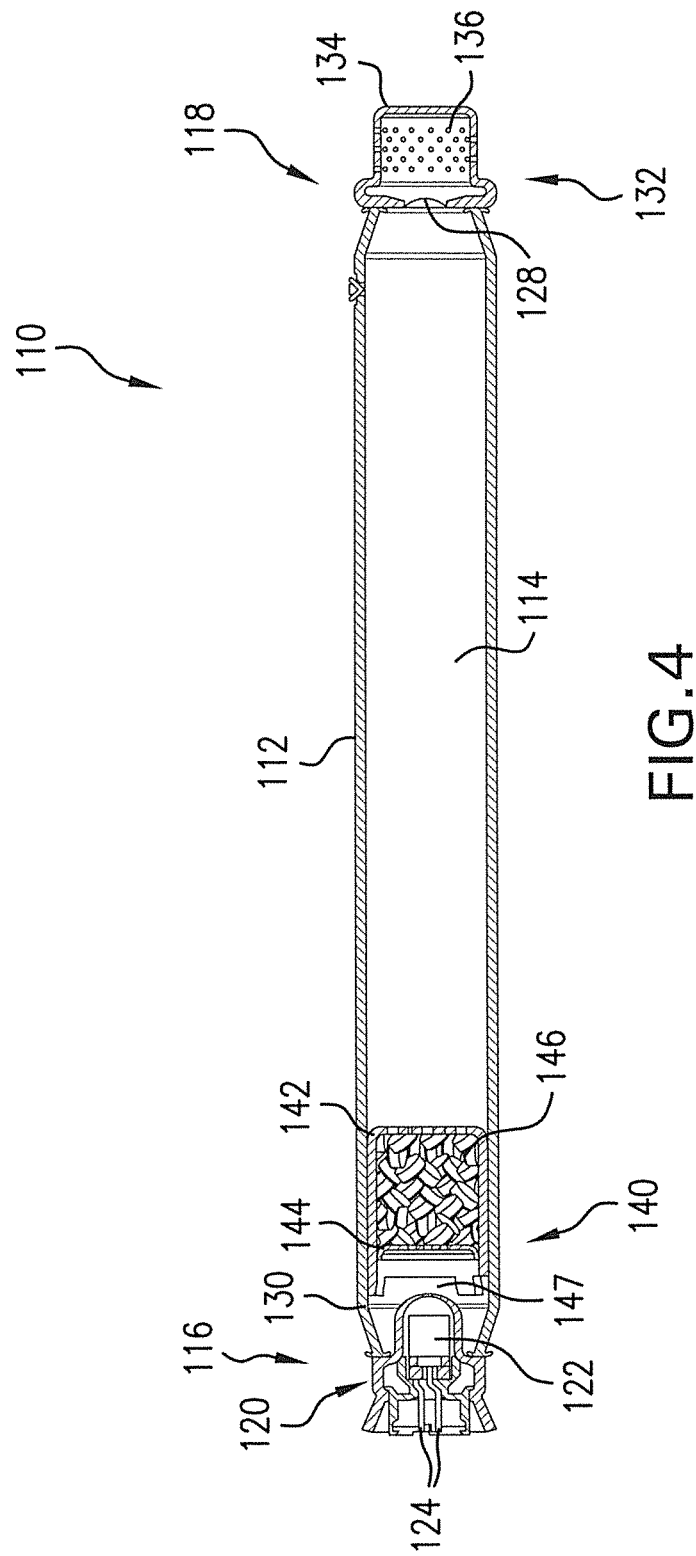
FIG. 4 is a sectional view of an inflator device in accordance with an alternative embodiment of the present development.

An inflator device as shown in FIG. 4.

Figure 12:
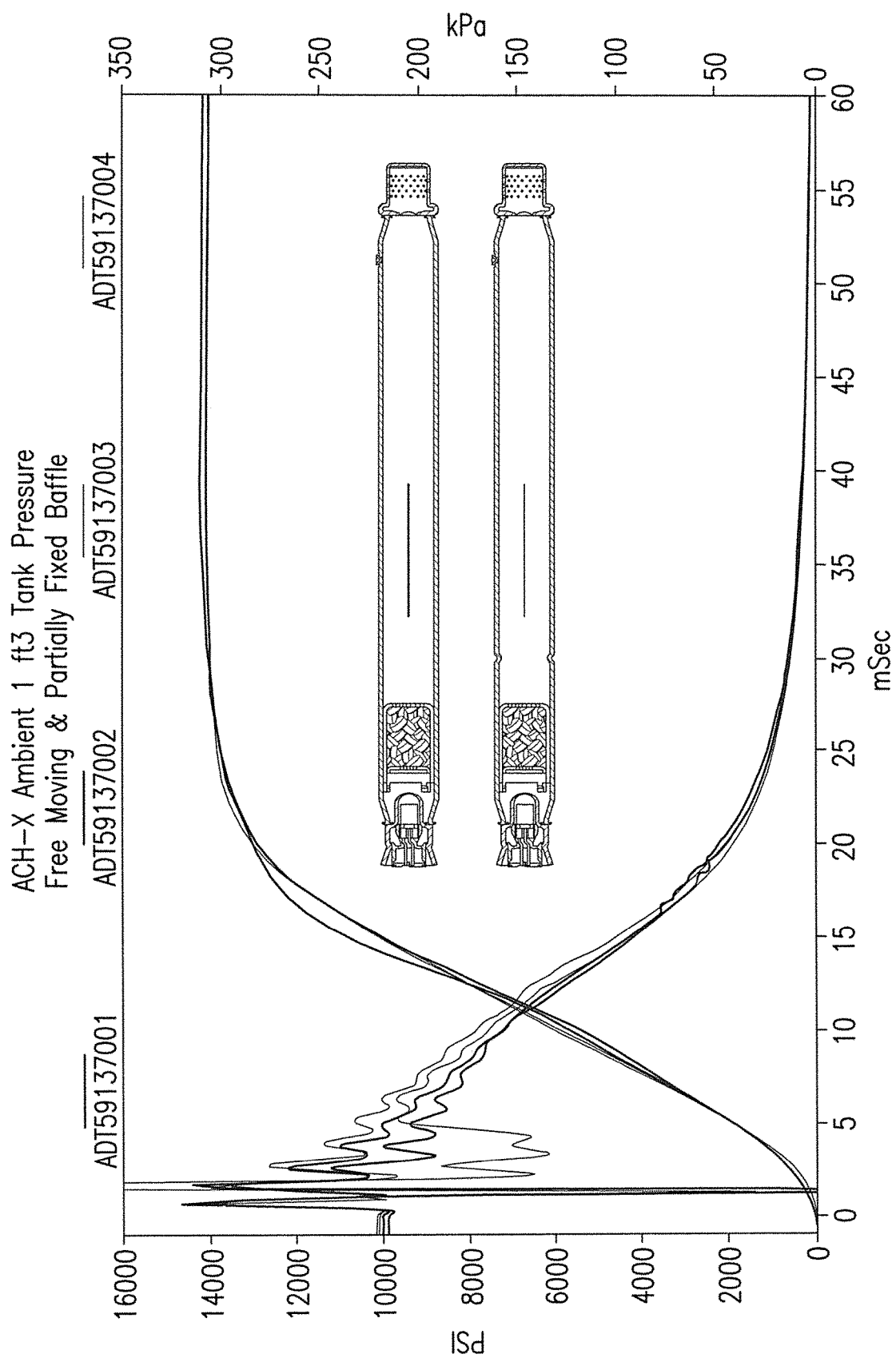

Inflator Tank Performance curves obtained with the inflator device of Example 4 are shown in FIG. 12.

Example 5

An inflator device as shown in FIG. 4 but now with a stop feature such as shown in the inflator device shown in FIG. 1, with the stop feature located approximately 25 mm from the end of the gas generator assembly when in the pre-actuation state.

Inflator Tank Performance curves obtained with the inflator device of Example 5 are shown in FIG. 12.

DISCUSSION OF RESULTS

The examples clearly show the benefit of allowing limited movement of the gas generator assembly.

Examples 1-3

The FIG. 9 Inflator Tank Performance curves obtained with the inflator device of Example 1 exhibited an undesirably high degree of variation. Similarly, the FIG. 10 Inflator Tank Performance curves obtained with the inflator device of Example 2 also exhibited an undesirably high degree of variation. The FIG. 11 Inflator Tank Performance curves obtained with the inflator device of Example 3, however, showed lower combustion pressures and TTFG. Moreover, the FIG. 11 Inflator Tank Performance curves obtained with the inflator device of Example 3 exhibited a comparatively significantly reduced degree of performance variation as compared to the inflator device used in Examples 1 and 2.

Examples 4 and 5

Based on the FIG. 12 Inflator Tank Performance curves obtained with the inflator devices of Examples 4 and 5, the use of a stop to limit the movement of a slidable gas generator assembly may not be required in at least certain embodiments. It is believed that containment of the gas generant material inside of the cup of the generator assembly during movement of the assembly within the chamber appears to minimize variation thus potentially eliminating the need for a stop. Similar to the inflator device shown in FIG. 1, movement of the gas generator assembly appears desired or needed to eliminate undesirably long delays (TTFG) and high combustion pressures. For example, for curtain/side inflators, delays or Time To First Gas requirements for an ambient deployment are generally in the order of less than 2 ms. In such a case, a "high" combustion pressure would typically be a pressure of in excess of 14,000 psi. In contrast, in embodiments wherein the gas generator assembly is not allowed slide or move and create a pressure wave, combustion pressures on the order of 18,000 psi can be reached. Thus, the incorporation and use of the slide movement within an assembly, such as herein described, can dramatically reduce combustion pressures, such as reducing combustion pressures by 20% or more in particular embodiments.

Additional studies have evaluated the effect on inflator performance of the placement or positioning of the slidable gas generator assembly within the inflator chamber on inflator performance. The studies have shown that the placement or positioning of the slidable gas generator assembly relative to the initiator affects performance. Testing with the upstream baffle positioned approximately 10 mm, 30 mm & 50 mm from the initiator/base dome have shown that locating the gas generator in close proximity to the initiator has generally resulted in lower performance variation.

Thus, the subject development provides improved inflator devices. More particularly, embodiments of the subject development provide improved inflator devices such as for improved hybrid inflator devices such avoids the need for the inclusion of a central channel aligned with the initiator opening for the unobstructed propagation of a pressure wave down the length of the inflator for the rapid opening of an inflator end closure but which desirably allows for the incorporation or inclusion relatively less costly gas generant material forms such as tablets, as compared to more expensive and complicated generant geometries such as wafers or grains, for example.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention

What is claimed is:

1. An inflator device for an inflatable restraint system, the inflator device comprising:
    a housing at least in part defining an elongated chamber and having oppositely disposed first and second axial ends, the elongated chamber containing an initial supply of stored inflation gas;
    an initiator disposed proximate the first axial end and an openable closure disposed proximate the second axial end; and
    a slidable gas generator assembly disposed within the elongated chamber between the initiator and the closure, the slidable gas generator comprising a downstream slidable baffle spaced apart from an upstream end baffle, the slidable gas generator including a supply of gas generant material disposed between said baffles, the gas generant material reactable upon initiation to produce additional inflation gas;
    wherein upon actuation of the inflator device, the initiator and the slidable gas generator assembly are adapted to cooperate to create a pressure wave to open the closure and to permit release of inflation gas from the elongated chamber and at least a portion of the supply of the gas generant material reacts to form said additional inflation gas.

2. The inflator device of claim 1 wherein upon actuation of the inflator device, the initiator is adapted to produce an output effective to slide the slidable gas generator assembly within the elongated chamber in an axial direction towards the second end and wherein the slide movement of the slidable gas generator assembly is effective to create the pressure wave to open the closure.

3. The inflator device of claim 1 wherein the downstream slidable baffle is an open top cup-shaped baffle.

4. The inflator device of claim 3 wherein the upstream end baffle is adapted for press fit engagement with the open top of the downstream baffle with the supply of gas generant material disposed therebetween.

5. The inflator device of claim 1 wherein the downstream baffle and the upstream baffle are independently slidable within the elongated chamber.

6. The inflator device of claim 1 wherein at least one of the downstream baffle and the upstream baffle comprises a generally axially perpendicular planar perforated wall with an axially extending side wall.

7. The inflator device of claim 6 wherein the downstream baffle comprises a generally axially perpendicular planar perforated wall with an axially extending side wall.

8. The inflator device of claim 6 wherein both the downstream baffle and the upstream baffle comprise a generally axially perpendicular planar perforated wall with an axially extending side wall.

9. The inflator device of claim 6 wherein the axially extending side wall forms a plurality of deformable tabs adapted upon longitudinal insertion of the respective baffle into the elongated chamber to deform and interference fit the respective baffle into a pre-actuation position within the elongated chamber.

10. The inflator device of claim 9 wherein the respective baffle comprises at least three of said deformable tabs.

11. The inflator device of claim 1 wherein the upstream baffle is disposed in close proximity to the initiator.

12. The inflator device of claim 11 wherein the upstream baffle is disposed no more than 15 mm from the initiator.

13. The inflator device of claim 1 additionally comprising a stop feature disposed between the first and second axial ends, the stop feature serving to limit axial movement of the slidable gas generator assembly within the elongated chamber.

14. The inflator device of claim 13 wherein the elongated chamber is composed of a cylindrical wall and the stop feature comprises a ring of reduced circumference formed in the cylindrical wall.

15. The inflator device of claim 13 wherein the stop feature is disposed no more than 30 mm from the pre-actuation position of the downstream baffle.

16. The inflator device of claim 1 wherein the supply of gas generant material of the slidable gas generator assembly is of tablet form.

17. A multi-stage inflator device, the multi-stage inflator device comprising the inflator device of claim 1 as a first inflator, and further comprising a second inflator device, the second inflator device comprising:
a second housing at least in part defining a second elongated chamber and having oppositely disposed first and second axial ends, the second elongated chamber containing an initial supply of second stored inflation gas;
a second initiator disposed proximate the first axial end and an openable second closure disposed proximate the second axial end; and
a second slidable gas generator assembly disposed within the second elongated chamber between the second initiator and the second closure, the second slidable gas generator including a second supply of gas generant material, the gas generant material reactable upon initiation to produce additional inflation gas;
wherein upon actuation of the second inflator device, the second initiator and the second slidable gas generator assembly are adapted to cooperate to create a second pressure wave to open the second closure and to permit release of inflation gas from the second elongated chamber and at least a portion of the second supply of the gas material reacts to form said additional inflation gas and
wherein the first and the second inflator devices are oppositely oriented with the second axial end of the first and second inflator devices each joined in fluid flow communication with a filter portion interposed therebetween.

18. A hybrid inflator device for an inflatable restraint system, the inflator device comprising:
a housing defining an elongated axially-extending chamber and having oppositely disposed first and second axial ends, the elongated chamber containing an initial supply of stored inflation gas;
an initiator disposed proximate the first axial end and an openable closure disposed proximate the second axial end; and
a slidable gas generator assembly disposed within the elongated chamber between the initiator and the closure, the slidable gas generator assembly including a downstream open top cup-shaped baffle spaced apart from a upstream end baffle with a supply of tablet form gas generant material disposed between said baffles, the gas generant material reactable upon initiation to produce additional inflation gas, wherein the downstream baffle and the upstream baffle are independently slidable within the elongated chamber;
wherein upon actuation of the inflator device, the initiator and the slidable gas generator assembly are adapted to cooperate to create a pressure wave to open the closure and to permit release of inflation gas from the elongated chamber and with the slidable gas generator assembly adapted to slide within the elongated chamber in an axial direction towards the second end and to initiate reaction of at least a portion of the supply of the gas material to form said additional inflation gas.

19. The hybrid inflator device of claim 18 wherein upon actuation of the inflator device, the initiator is adapted to produce an output effective to slide the slidable gas generator assembly within the elongated chamber in an axial direction towards the second end and wherein the slide movement of the slidable gas generator assembly is effective to create the pressure wave to open the closure.

20. The hybrid inflator device of claim 18 wherein the downstream baffle and the upstream baffle are independently slidable within the elongated chamber.

21. The hybrid inflator device of claim 18 wherein the downstream baffle comprises a generally axially perpendicular planar perforated wall with an axially extending side wall, the axially extending side wall forming at least three deformable tabs adapted upon longitudinal insertion of the baffle into the elongated chamber to deform and interference fit the baffle into a pre-actuation position within the elongated chamber.

22. The hybrid inflator device of claim 18 wherein the elongated chamber is composed of a cylindrical wall and wherein the hybrid inflator device additionally comprises a stop feature disposed between the first and second axial ends of the elongated chamber, the stop feature serving to limit axial movement of the slidable gas generator assembly within the elongated chamber, the stop feature comprising a ring of reduced circumference formed in the cylindrical wall.

23. A dual stage hybrid inflator device for an inflatable restraint system, the dual stage hybrid inflator device comprising the inflator device of claim 18 as a first inflator device and further comprising a second inflator device, the second inflator device comprising:
a second housing defining a second elongated axially-extending chamber and having oppositely disposed first and second axial ends, the second elongated chamber containing an initial supply of second stored inflation gas;
a second initiator disposed proximate the first axial end and an openable second closure disposed proximate the second axial end; and a second slidable gas generator assembly disposed within the second elongated chamber between the second initiator and the second closure, the second slidable gas generator assembly including a second downstream open top cup-shaped baffle spaced apart from a second upstream end baffle with a second supply of tablet form gas generant material disposed between said baffles, the gas generant material reactable upon initiation to produce additional inflation gas, wherein the second downstream baffle and the second upstream baffle are independently slidable within the second elongated chamber;

wherein upon actuation of the second inflator device, the second initiator and the second slidable gas generator assembly are adapted to cooperate to create a pressure wave to open the second closure and to permit release of inflation gas from the second elongated chamber and with the second slidable gas generator assembly adapted to slide within the second elongated chamber in an axial direction towards the second end and to initiate reaction of at least a portion of the second supply of the gas material to form said additional inflation gas and wherein the first and the second inflator devices are oppositely oriented with the second axial end of the first and second inflator devices each joined in fluid flow communication with a filter portion interposed therebetween.

* * * * *